No. 677,371. Patented July 2, 1901.
W. B. POTTER.
ELECTRICAL DISTRIBUTION.
(Application filed June 12, 1899.)
(No Model.)
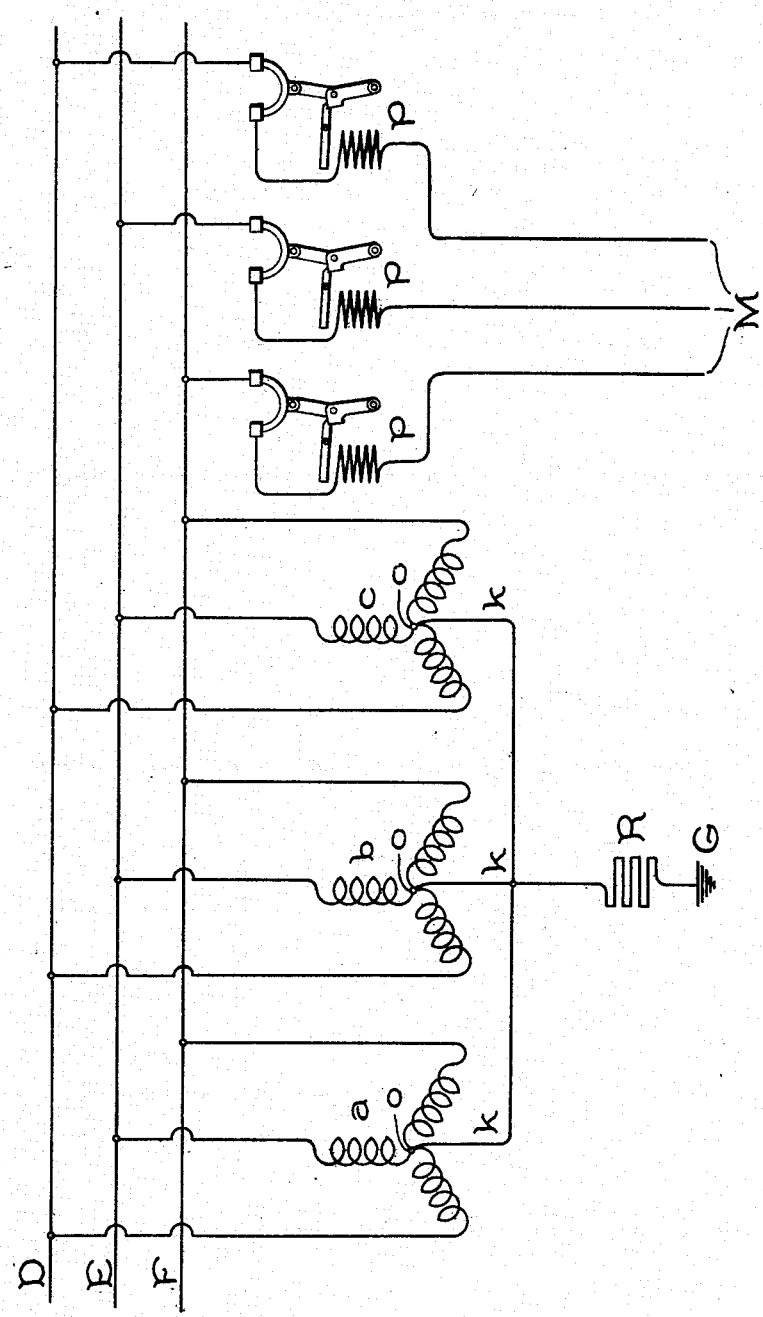
WITNESSES.
Edw. Williams, Jr.
A. F. Macdonald.
INVENTOR.
William B. Potter,
by Albert G. Davis,
Atty.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

ELECTRICAL DISTRIBUTION.

SPECIFICATION forming part of Letters Patent No. 677,371, dated July 2, 1901.

Application filed June 12, 1899. Serial No. 720,292. (No model.)

*To all whom it may concern:*

Be it known that I, WILLIAM B. POTTER, a citizen of the United States, residing at Schenectady, county of Schenectady, State of New York, have invented certain new and useful Improvements in Systems of Electrical Distribution, (Case No. 1,055,) of which the following is a specification.

If in the operation of three-phase alternating-current systems one of the lines were to become accidentally grounded, the strain upon the insulation between the other lines and ground would be represented by the difference of potential between those lines and the grounded line. In cases where high differences of potential are employed this strain upon the insulation may be dangerously large. For the purpose, therefore, of reducing the liability to breakdown of the insulation it has been proposed to ground the neutral point or neutral conductor of the three-phase system, thus reducing the difference of potential between the lines and ground to approximately six-tenths of that existing between any two of the lines. The grounding of the neutral is, however, objectionable, since it forms a short circuit in case any point on the lines is grounded. A single ground would therefore disable the entire system, at the same time probably causing serious damage owing to the fact that the circuit-breakers and other safety devices of the system would ordinarily be unable, because of their limited capacity, to rupture the large currents due to short-circuit as instantaneously as would be necessary to prevent injury to the system. I therefore propose to insert a resistance in series with the ground connection of the neutral of such a value as to limit the current in the grounded feeders or main conductors to such an amount as could be safely handled by the automatic circuit-breakers in circuit therewith, but at the same time of a value low enough to insure the opening of the circuit-breakers by allowing current to pass of a value somewhat greater than that for which the circuit-breakers are set.

The details of my invention will be better understood by reference to the accompanying drawing, while its scope will be particularly pointed out in the claims appended hereto.

In the drawing, $a\ b\ c$ represent the armature-windings of three-phase generators, the coils of each winding being shown as connected to a common point, such a connection being known in the art as a "star" connection. For the sake of simplicity the field-windings of the generators have not been shown; but the structure will nevertheless be readily understood. The common point of connection of the coils of each generator is indicated at $o$, and these points are connected together by the conductors $k\ k\ k$ and to ground G through a resistance R of suitable value.

The leads of the several generators $a,\ b,$ and $c$ are connected to bus-bars or supply-mains D E F, as shown. Feeders M lead from the supply-mains D E F, and in circuit with each feeder I prefer to place an automatic circuit-breaker P of any suitable and well-known type. In the drawings I have indicated a conventional form of circuit-breaker; but it is to be understood that the particular form employed is immaterial.

In case one of the feeders M becomes grounded current will immediately pass to ground from the feeder; but the value of this current will be limited by the resistance R to an amount which can safely be handled by the circuit-breaker in the feeder; but at the same time the resistance R is so chosen that the current will be sufficiently large to operate the circuit-breaker and cut out the feeder. Without the insertion of the resistance R the current might be so large that the circuit-breaker would fail to operate by reason of the large arc which would be formed, thus continuing the short circuit and so causing serious damage to the system.

While I have shown my invention as applied to a three-phase alternating-current system, it will of course be understood that the same is not limited thereto, but is applicable to any other system in which grounded returns or neutrals are employed.

What I claim as new, and desire to secure by Letters Patent of the United States, is—

1. The combination of a source of current, mains leading therefrom, circuit-breakers in said mains, a connection between ground and a point of neutral potential on said source and means for limiting the flow of current to ground.

2. The combination with a multiphase alternating-current system, of a circuit-breaking device or devices in a conductor or conductors of said system, and a grounded neutral with a resistance in circuit therewith.

3. The combination with a three-phase alternating-current system, of circuit-breaking devices for said system, an electrical connection between ground and a point of neutral potential in the system and a resistance included in said electrical connection.

4. The combination of a plurality of three-phase alternating-current generators with "star" connected generating-windings in multiple with each other, and electrical connections between the neutral points of said windings and ground.

5. The combination of a source of current, feeders connected thereto, circuit-breaking devices in said feeders, an electrical connection between ground and a neutral point of the system, and a resistance included in said electrical connection.

6. The combination of a source of multiphase current, feeders connected thereto, circuit-breaking devices in said feeders, an electrical connection between ground and a neutral point of the system, and a resistance included in said electrical connection.

In witness whereof I have hereunto set my hand this 9th day of June, 1899.

WILLIAM B. POTTER.

Witnesses:
BENJAMIN B. HULL,
MABEL E. JACOBSON.